United States Patent
Zhang et al.

(10) Patent No.: US 12,513,206 B2
(45) Date of Patent: Dec. 30, 2025

(54) CODEC SELECTION USING CODEC LIST PRIORITIZED BASED ON CALL CONDITIONS

(71) Applicant: T-Mobile USA, Inc., Bellevue, WA (US)

(72) Inventors: Lin Zhang, Overland Park, KS (US); Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/360,575

(22) Filed: Jul. 27, 2023

(65) Prior Publication Data

US 2025/0039256 A1 Jan. 30, 2025

(51) Int. Cl.
| | |
|---|---|
| H04B 7/00 | (2006.01) |
| G06K 9/00 | (2022.01) |
| G10L 19/22 | (2013.01) |
| H04L 65/1106 | (2022.01) |
| H04L 65/65 | (2022.01) |
| H04L 65/80 | (2022.01) |
| H04M 7/00 | (2006.01) |
| H04N 7/14 | (2006.01) |

(52) U.S. Cl.
CPC .......... *H04L 65/80* (2013.01); *H04L 65/1106* (2022.05); *H04L 65/65* (2022.05)

(58) Field of Classification Search
CPC ....... H04L 65/80; H04L 65/1106; H04L 65/65
See application file for complete search history.

(56) References Cited

U.S. PATENT DOCUMENTS

| | | | |
|---|---|---|---|
| 5,991,642 A | 11/1999 | Watanabe et al. | |
| 6,571,107 B1 | 5/2003 | Yahagi | |
| 7,463,901 B2 | 12/2008 | Svedberg et al. | |
| 9,161,286 B2 | 10/2015 | Enström et al. | |
| 10,057,393 B2 | 8/2018 | Kwok et al. | |
| 11,381,678 B2* | 7/2022 | Mohammed | H04M 3/26 |
| 2007/0043558 A1* | 2/2007 | Schwarz | H04W 88/181 |
| | | | 704/207 |
| 2008/0008160 A1* | 1/2008 | Uhler | H04L 47/10 |
| | | | 370/395.2 |
| 2008/0013544 A1* | 1/2008 | Ginde | H04L 65/1101 |
| | | | 370/465 |
| 2008/0081648 A1* | 4/2008 | Kang | H04M 7/0072 |
| | | | 455/500 |
| 2009/0059818 A1* | 3/2009 | Pickett | H04L 65/1106 |
| | | | 370/259 |

(Continued)

*Primary Examiner* — Abdullahi E Salad
(74) *Attorney, Agent, or Firm* — Lee & Hayes, P.C.

(57) ABSTRACT

UEs can determine a codec to use for a call based on a codec priority list. A UE can dynamically determine a priority order for the codec priority list based on call conditions experienced by the UE, such that a low bitrate codec may be indicated as the highest priority on the codec priority list if the UE is experiencing relatively poor call conditions. The UE that receives the codec priority list can select a codec from the codec priority list to use during the call. The UE that receives the codec priority list may select one of the listed codecs based on call conditions experienced by that UE, such that the UE may select a low bitrate codec due to relatively poor call conditions being experienced by that UE even if the low bitrate codec is not identified on the codec priority list as the highest-priority codec.

10 Claims, 5 Drawing Sheets

(56) References Cited

U.S. PATENT DOCUMENTS

| | | | | |
|---|---|---|---|---|
| 2010/0070286 | A1* | 3/2010 | Kampmann | H04W 88/181 |
| | | | | 704/500 |
| 2012/0044931 | A1* | 2/2012 | Harper | H04L 65/1069 |
| | | | | 370/352 |
| 2012/0162348 | A1* | 6/2012 | Choi | H04L 65/80 |
| | | | | 345/428 |
| 2015/0117236 | A1* | 4/2015 | Dunne | H04M 7/0072 |
| | | | | 370/252 |
| 2016/0352801 | A1* | 12/2016 | Krishna | H04L 43/0894 |
| 2017/0289319 | A1* | 10/2017 | Kwok | H04L 69/22 |
| 2019/0141086 | A1* | 5/2019 | Youtz | H04L 65/1016 |
| 2019/0289132 | A1* | 9/2019 | Jung | H04M 7/0072 |
| 2022/0018784 | A1* | 1/2022 | Guadiuso | G16H 50/20 |
| 2022/0182495 | A1* | 6/2022 | Kwok | H04W 24/04 |
| 2022/0237740 | A1* | 7/2022 | Lu | G06T 3/4046 |
| 2022/0309345 | A1* | 9/2022 | Doggett | G06N 3/08 |
| 2023/0326088 | A1* | 10/2023 | Bv | G06T 9/002 |
| | | | | 382/232 |
| 2024/0257819 | A1* | 8/2024 | Boros | G10L 25/30 |

\* cited by examiner

CODEC SELECTION USING CODEC LIST PRIORITIZED BASED ON CALL CONDITIONS

BACKGROUND

In a telecommunication network, a user equipment (UE) can wirelessly connect to one or more base stations associated with the telecommunication network. For example, a UE can wirelessly connect to one or more gNBs or other base stations of a radio access network (RAN) to access the telecommunication network.

When a UE connects to the telecommunication network, the UE can engage in voice calls, video calls, data transfers, or other types of communications. For example, the UE can make a voice call to another UE, or accept a voice call from another UE.

Audio data for a voice call that is transmitted via the telecommunication network can be digitally encoded and/or decoded using various codecs. During setup of a voice call between two UEs, the UEs may use a media negotiation process to determine which particular codec to use for the voice call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

UEs, such as mobile phones or other types of user equipment, can connect to telecommunication networks to engage in voice calls, video calls, data transfers, or other types of communications. For example, a UE can wirelessly connect to a base station of a telecommunication network, such as a gNB of a fifth generation (5G) New Radio (NR) radio access network. When connected to the base station, the UE can send uplink data to the base station and receive downlink data from the base station, in order to send and receive data, make and receive calls, and/or perform other operations via the telecommunication network.

UEs can support various codecs that can be used to encode and decode audio data associated with calls. In many systems, a calling UE that is attempting to set up a call with a called UE may send the called UE a preconfigured static list of codecs that are supported by the calling UE. The called UE may be configured to select the highest-priority codec on the provided codec list that the called UE also supports, such that the UEs can use a codec that is supported by both of the UEs during the call.

However, selection of a codec for a call based on such a preconfigured static list may not account for radio frequency (RF) conditions and/or other call conditions that are experienced by one or both of the UEs. For instance, the calling UE may be configured to prioritize use of a particular codec that provides high audio quality by encoding audio data at relatively high bitrates, and may thus send a called UE a preconfigured static codec list that identifies the particular codec as the highest-priority codec on the codec list. However, if the calling UE is experiencing relatively poor RF conditions, transmission of relatively high bitrate audio data encoded by the particular codec may be more likely to fail, use more transmission power, lead to audio disruptions, lead to the call being dropped, and/or cause other problems with the call than if another codec that uses lower bitrates had been used. Similarly, if the calling UE was experiencing relatively good RF conditions, but the called UE was experiencing relatively poor RF conditions, selection of the high-bitrate codec by the called UE because it was the highest-priority codec on the calling UE's preconfigured static codec list may similarly be more likely to cause problems with the call than if another codec that uses lower bitrates had been selected.

The systems and methods described herein allow a UE to dynamically prioritize codecs, on a list of codecs sent to another UE during a codec negotiation process, based on current call conditions. Accordingly, while the UE may prioritize a codec that offers the highest call quality on such a codec list when the UE is experiencing relatively good RF conditions, the UE may prioritize a different codec that uses a lower bitrate when the UE is experiencing relatively poor RF conditions. A UE that receives such a codec list from another UE may also dynamically select one of the listed codecs based on call conditions that are being experienced by the UE that receives the codec list. For instance, if a codec list sent by a calling UE to a called UE lists a high bitrate codec as the highest-priority codec because the calling UE is experiencing relatively good RF conditions, but the codec list also includes a lower-bitrate codec as a lower priority, the called UE may select the lower-priority lower-bitrate codec for the call if the called UE is itself experiencing relatively poor RF conditions.

Example Environment

Figure 1:
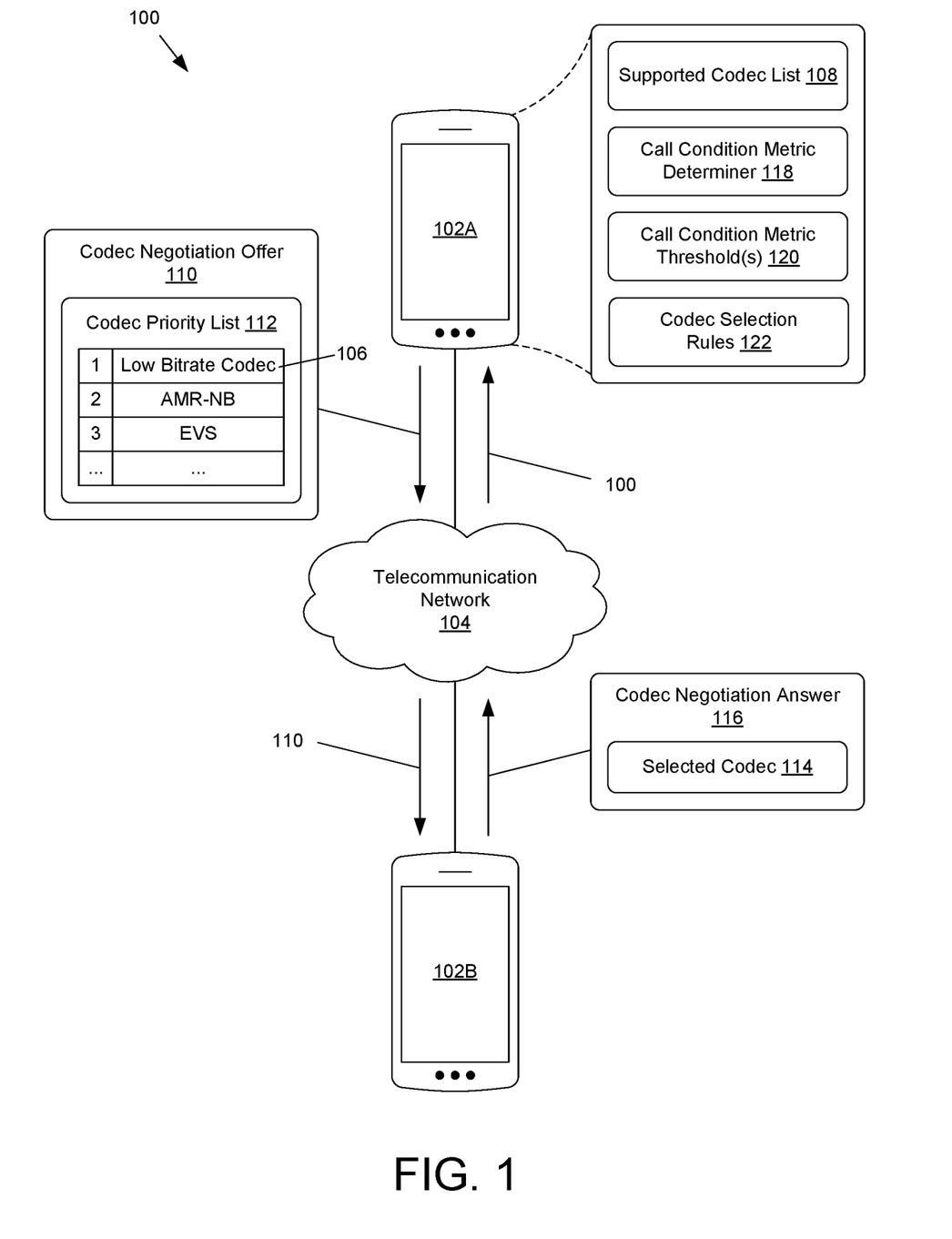
FIG. 1 shows an example of a network environment in which UEs can communicate via a telecommunication network.

FIG. 1 shows an example 100 of a network environment in which UEs 102 can communicate via a telecommunication network 104. The UEs 102 can include different UEs 102, such as a first UE 102A and a second UE 102B as shown in FIG. 1. When a UE 102 connects to the telecommunication network 104, the UE 102 can engage in communication sessions for voice calls, video calls, messaging, data transfers, and/or any other type of communication via the telecommunication network 104. In some examples, UEs 102 connected to the telecommunication network 104 may engage in communication sessions with other UEs 102 that are connected to the same telecommunication network 104 and/or other telecommunication networks 104.

The UEs 102 can be any devices that can wirelessly connect to base stations and/or other access points associated with the telecommunication network 104, such that the UEs 102 can connect to the telecommunication network 104. In some examples, a UE 102 can be a mobile phone, such as a smart phone or other cellular phone. In other examples, a UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

The telecommunication network 104 can include an access network, such as a radio access network (RAN). The access network can have base stations and/or other access points to which UEs 102 can connect. The telecommunication network can also have a core network linked to the access network. UEs 102 can wirelessly connect to base stations and/or other access points of the access network, and in turn be connected to the core network via the base stations. The core network can also link the UEs to an Internet Protocol (IP) Multimedia Subsystem (IMS), the Internet, and/or other networks.

The UEs 102 and elements of the telecommunication network 104, such as elements of the access network and/or the core network, can be compatible with one or more radio access technologies, wireless access technologies, protocols, and/or standards. For example, the UEs 102, base stations of the access network, and/or elements of the core network can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, a base station associated with the telecommunication network 104 can be a gNB of a 5G access network. As another example, the access network can be an LTE access network, known as an Evolved UMTS Terrestrial Radio Access Network (E-UTRAN), and a base station associated with the telecommunication network 104 can be an evolved Node B (eNB) of the LTE access network. The core network can also be based on LTE or 5G. For instance, the core network can be a 5G core network or an LTE packet core network known as an Evolved Packet Core (EPC). Elements of the access network and elements of the core network may be based on the same radio access technology, or different radio access technologies. For instance, in some examples a base station can be a 5G gNB that is linked to an LTE core network and/or a 5G core network.

As discussed above, voice calls can be established between different UEs 102 via the telecommunication network 104. For example, the first UE 102A can call the second UE 102B, such that the first UE 102A can be considered a calling or originating UE, and the second UE 102B can be considered a called or terminating UE.

During voice calls, the UEs 102 can use codecs to digitally encode and/or decode audio data associated with the voice calls. Various codecs may be used for voice calls. For example, UEs 102 may use codecs that are standardized by the 3rd Generation Partnership Project (3GPP) and/or other standards organizations, such as an Adaptive Multi-Rate Narrowband (AMR-NB) codec, an Adaptive Multi-Rate Wideband (AMR-WB) codec, an Adaptive Multi-Rate Superwideband (AMR-SWB), an Enhanced Voice Services (EVS) codec, and/or other codecs.

UEs 102 may, in some examples, also support other codecs, such as a low bitrate codec 106. The low bitrate codec 106 can be a codec that may or may not be standardized by 3GPP and/or other standards organizations. The low bitrate codec 106 can be configured to encode audio data using lower bitrates than AMR-NB, AMR-WB, AMR-SWB, EVS, and/or other types of codecs. For example, although some codecs may be parametric codecs that identify speech parameters within a waveform, encode the parameters into encoded audio data, and later decode the audio data to reconstruct a representation of the original waveform, the low bitrate codec 106 may use machine learning and/or other different techniques to encode audio data at lower bitrates than parametric codecs or other types of codecs.

In some examples, the low bitrate codec 106 may be a narrowband speech codec that is configured to encode audio data using lower bitrates than other codecs in part by encoding audio within a narrow band of audio frequencies that correspond to human voices during speech, such as frequencies from 300 Hz to 3400 Hz, and by not encoding other audio at other frequencies that are outside that narrow band. Accordingly, the low bitrate codec 106 can encode audio data using lower bitrates than other types of codecs that encode wideband frequencies in a range of 50 Hz to 7000 Hz that is often used for "high definition" voice calls, superwideband frequencies in a range of 50 Hz to 14,000 Hz or higher, and/or at other frequency ranges. The low bitrate codec 106 can also, or alternately, be configured to encode audio data at lower sampling rates than other codecs, encode audio data based on machine learning algorithms, and/or use other techniques such that audio data is encoded using lower bitrates than AMR-NB, AMR-WB, AMR-SWB, EVS, and/or other types of codecs.

As a non-limiting example, the low bitrate codec 106 may be a codec developed by Google® that is known as Lyra. The Lyra codec is based on a machine learning model that has been trained on sample data to learn low bitrate compression techniques. The Lyra codec can, for example, extract speech features from input audio data every 40 ms, represent the extracted speech features as log mel spectrograms that represent speech energy in different frequency bands, and compress the extracted speech features into encoded audio data. The Lyra codec can use a generative model when decoding encoded audio data to recreate a representation of the input audio data, for example by generating multiple parallel signals in different frequency ranges and combining the parallel signals, which may allow the recreated representation of the input audio data to sound relatively natural to a human listener despite the audio data having been encoded at lower bitrates than are used by parametric codecs or other types of codecs. For instance, the Lyra codec may encode audio data at a low bitrate of 3 kbps, but when Lyra's generative model decodes the audio data, the audio data may sound more natural to a human listener than audio data that is encoded by other codecs at higher bitrates.

In other examples, the low bitrate codec 106 can be another type of codec that compresses audio data at lower bitrates than AMR-NB, AMR-WB, AMR-SWB, EVS, and/or other types of codecs, such as Speex, Opus, or another low bitrate codec. As discussed above, in some examples the low bitrate codec 106 may be a codec that has not been standardized by 3GPP, but can encode audio data at lower bitrates than other 3GPP-standardized codecs. However, in other examples, the low bitrate codec 106 may be a standardized codec that can encode audio data at lower bitrates than other standardized codecs.

In some situations, usage of the low bitrate codec 106 during a call may lead to an improved user experience and/or other benefits relative to usage of other codecs that may encode audio data at higher bitrates. For example, in relatively poor RF conditions, audio data encoded at lower bitrates via the low bitrate codec 106 may be more likely to be transmitted without interruptions, without error, and/or with lower transmission power, relative to attempting to transmit audio data encoded at higher bitrates. While usage of higher-bitrate codecs during poor RF conditions may lead to audio interruptions, a call drop, and/or other errors that may negatively impact user experiences during a voice call, audio data encoded at lower bitrates via the low bitrate codec 106 may be more likely to be successfully transmitted during poor RF conditions and thereby allow users to talk and understand each other during the call despite the poor RF conditions. However, in other situations, usage of other higher-bitrate codecs may provide better user experiences and/or offer other benefits relative to usage of the low bitrate codec 106. For example, during relatively good RF conditions audio data encoded at higher bitrates may be likely to be successfully transmitted, and 3GPP codecs such as AMR-NB, AMR-WB, AMR-SWB, and/or EVS may provide improved audio quality during a voice call relative to lower-bitrate audio data encoded by the low bitrate codec 106. Accordingly, as discussed further below, a codec used for a voice call between UEs 102 can be dynamically selected at least in part based on RF conditions and/or other call conditions that are being experienced by one or more of the UEs 102.

Different UEs 102 may support different sets of codecs. For example, UEs 102 may be configured to support one or more 3GPP codecs such as AMR-NB, AMR-WB, AMR-SWB, and/or EVS. However, such UEs 102 may or may not also support a separate low bitrate codec 106, such as Lyra, which in some examples may have not been standardized by 3GPP. For instance, some manufacturers of UEs 102 may configure their UEs 102 to support standardized 3GPP codecs as well as a non-standardized low bitrate codec 106 such as Lyra, while other manufacturers of UEs 102 may configure their UEs 102 to only support standardized 3GPP codecs. Individual UEs 102 can accordingly each maintain a supported codec list 108 that indicates the codecs that the UEs 102 support.

Because different UEs 102 may support different codecs, during setup of a voice call between UEs 102 a codec negotiation process can be used to select a codec for the voice call that is supported by both of the UEs 102. As an example, during setup of a voice call between an originating UE 102 and a terminating UE 102, the originating UE 102 can send a codec negotiation offer 110 to the terminating UE 102. In some examples, the codec negotiation offer 110 can be a Session Description Protocol (SDP) offer included in a Session Initiation Protocol (SIP) INVITE message or other SIP message. The codec negotiation offer 110 sent by the originating UE 102 can include a codec priority list 112 that identifies codecs that the originating UE 102 supports, for instance based on a supported codec list 108 maintained by the originating UE 102. The terminating UE 102 can select one of the codecs on the codec priority list 112 that the terminating UE 102 also supports, for instance based on a supported codec list 108 maintained by the terminating UE 102, as a selected codec 114 that will be used for the voice call. The terminating UE 102 can return an identifier of the selected codec 114 to the originating UE 102 in a codec negotiation answer 116. In some examples, the codec negotiation answer 116 can be an SDP answer included in a 183 Session Progress response, a 200 OK message, or another response message that is returned by the terminating UE 102 to the originating UE 102. Because both the originating UE 102 and the terminating UE 102 support the selected codec 114, the originating UE 102 and the terminating UE 102 can use the selected codec 114 for the voice call. The UEs 102 may also cause bearers and other resources to be established via the telecommunication network to transmit audio data and/or other data associated with the voice call.

A similar codec renegotiation process may also occur during a voice call after the voice call has been established, for instance to renegotiate and potentially change which codec is used for the voice call. Such a codec renegotiation process may be initiated by any of the UEs 102 associated with a call, such as by the original originating UE 102 or by the original terminating UE 102. In some instances, a codec renegotiation process that occurs during a voice call may lead to selection of the same codec that is already currently being used for the voice call, such that no codec change occurs. However, if a codec renegotiation process leads to a selection of codec that is different than the codec currently being used for a voice call, the UEs 102 can switch to using the newly-selected codec. The UEs 102 may switch the codec while the voice call is ongoing, for instance without disconnecting or restarting the call. The codec switch may be transparent to the users, with no or minimal audio interruptions as the UEs 102 change from using the previous codec to using the newly-selected codec during the call.

As an example, during an existing voice call between two UEs 102 that is already using a previously-negotiated codec, one of the UEs 102 may determine that the codec used for the voice call could or should be changed. Accordingly, the UE 102 may initiate a codec renegotiation process by sending a codec priority list 112 to the other UE 102 in a new codec negotiation offer 110, for instance via a SIP RE-INVITE message, a SIP UPDATE message, or other type of message. The other UE 102 can select a selected codec 114 from the codec priority list 112, for instance by choosing the same previously-negotiated codec or a different codec, and indicate the selected codec 114 via a new codec negotiation answer 116. If the selected codec 114 indicated by the other UE 102 in the new codec negotiation answer 116 is different from the previously-negotiated codec, the two UEs 102 can switch to using the new selected codec 114 during the existing voice call.

The codec priority list 112 sent by a UE 102 in a codec negotiation offer 110 can list codecs in a priority order, or otherwise indicate priority values associated with corresponding codecs. As an example, the codec priority list 112 may indicate that the low bitrate codec 106 has the highest priority, that the AMR-NB codec has the second-highest priority, and that the EVS codec has the third-highest priority, as shown in FIG. 1. In other examples, the codec priority list 112 may list different codecs and/or the same codecs in a different priority order. For instance, in some situations, the codec priority list 112 may indicate that the low bitrate codec 106 is not the highest-priority codec and/or is the lowest-priority codec. The low bitrate codec 106 may also be omitted from the codec priority list 112 in some examples, for instance if the UE 102 sending the codec negotiation offer 110 does not support the low bitrate codec 106.

The UE 102 that sends the codec negotiation offer 110 can dynamically determine the priority order of the codecs on the codec priority list 112 based on one or more types of call condition metrics. Call condition metrics can be associated with RF conditions and/or other conditions corresponding to a wireless connection between the UE 102 and the telecommunication network 104. For example, call condition metrics can include signal strength values, such as Reference Signal Received Power (RSRP) values, Reference Signal Received Quality (RSRQ) values, Received Signal Strength Indicator (RSSI) values, Signal to Noise Ratio (SNR) values, Signal to Interference plus Noise Ratio (SINR) values, and/or other types of signal strength measurements.

In some examples in which the codec negotiation offer 110 is sent as part of a codec renegotiation process to potentially change the codec being used during an already-established call, the call condition metrics can also, or alternately, include call quality metrics associated with the established call. For example, if a voice call has already been established between UEs 102 and the UEs 102 are exchanging audio data associated with the voice call, the call condition metrics can include packet loss rate values, jitter values, latency values, and/or other metrics associated with transmission and/or receipt of the audio data. Such call condition metrics may indicate whether users of the UEs 102 are likely to be experiencing audio interruptions, garbled audio, and/or other audio quality issues that are negatively impacting a user experience during the established voice call. For instance, a relatively high packet loss rate and/or a relatively high latency measurement may indicate that data packets associated with encoded audio data are being lost and/or are not being delivered quickly enough, such that users may be likely to notice audio interruptions during the call.

In some examples, a UE 102 can have a call condition metric determiner 118 that is configured to measure values of one or more call condition metrics, such as signal strength measurements or other RF condition metrics, call quality metrics, and/or other call condition metrics. In other examples, the call condition metric determiner 118 or other elements of a UE 102 can also, or alternately, receive values of one or more call condition metrics from a base station, another element associated with the telecommunication network, and/or another UE that is configured to measure or determine the one or more call condition metrics.

The UEs 102 can also be configured with call condition metric thresholds 120 associated with one or more types of call condition metrics. The call condition metric thresholds 120 can indicate which values of corresponding call condition metrics are considered to be associated with good call conditions and which values of the call condition metrics are considered to be associated with poor call conditions. Accordingly, the UEs 102 can determine whether values of call condition metrics determined by the call condition metric determiner 118 satisfy the corresponding call condition metric thresholds 120, for instance by determining whether values of call condition metrics are above, equal to, or below corresponding call condition metric thresholds 120 and/or are within ranges associated with good call conditions or poor call conditions.

The UEs 102 can be configured to dynamically generate the codec priority list 112, including dynamically determining the priority order of codecs indicated by the codec priority list 112, based on whether one or more call condition metrics satisfy corresponding call condition metric thresholds 120. A UE 102 may be configured to include any or all of the codecs on the UE's supported codec list 108 on the codec priority list 112, but may adjust the priorities of those codecs on the codec priority list 112 based on whether one or more one or more call condition metrics satisfy corresponding call condition metric thresholds 120. If the UE 102 supports the low bitrate codec 106, the UE 102 can be configured to rank the low bitrate codec 106 as the highest priority, and/or as a higher priority than at least one other codec, on the codec priority list 112 if a comparison of one or more call condition metrics with corresponding call condition metric thresholds 120 indicate that the UE 102 is experiencing relatively poor call conditions, but rank the low bitrate codec 106 as a lower priority if the call condition metrics instead indicate that the UE 102 is experiencing relatively good call conditions.

As a non-limiting example, one of the call condition metric thresholds 120 used by UE 102A may be an RSRP value of −120 dBm. If the call condition metric determiner 118 of UE 102A determines that the RSRP value currently associated with a wireless connection between UE 102A and the telecommunication network 104 is at or below the −120 dBm threshold RSRP value, UE 102A can determine that current RF conditions are relatively poor, and can be configured to list the low bitrate codec 106 as the highest-priority codec on the codec priority list 112. As discussed above, in poor RF conditions low bitrate audio data encoded by the low bitrate codec 106 may be more likely to be successfully transmitted than higher bitrate audio data encoded by other higher-bitrate codecs. Accordingly, UE 102A can dynamically generate the codec priority list 112 to indicate that the low bitrate codec 106 is the highest-priority codec, for instance by listing the low bitrate codec 106 first on the codec priority list 112 or by including a value in the codec priority list 112 indicating that the low bitrate codec 106 is the highest-priority codec on the codec priority list 112. UE 102A may also list other codecs supported by UE 102A as lower-priority codecs on the codec priority list 112, in some examples in a priority order determined based on stored prioritization rules or priority preferences associated with the other codecs, the call condition metrics, and/or corresponding threshold values associated with the other codecs.

However, in this example, if the call condition metric determiner 118 of UE 102A determines that the RSRP value currently associated with the wireless connection between UE 102A and the telecommunication network 104 is above the −120 dBm threshold RSPR value, UE 102A can instead determine that current RF conditions are good enough that one or more other codecs can be listed on the codec priority list 112 as higher priorities than the low bitrate codec 106. UE 102A may accordingly indicate on the codec priority list 112 that the low bitrate codec 106 is a lower priority than one or more other codecs.

Although a threshold RSRP value of −120 dBm is used in the example discussed above, a higher or lower threshold RSRP value may be used in other examples. Similarly, call condition metric thresholds 120 associated with one or more other types of call condition metrics can be used in other examples in addition to, or instead of a threshold RSRP value. In some examples, one or more elements of the telecommunication network 104 can configure and/or reconfigure the call condition metrics and call condition metric thresholds 120 used by one or more UEs 102. For example, a base station of the telecommunication network 104, or an element in the core network of the telecommunication network 104, may send reconfiguration data to a UE 102 that adjusts the types and/or values of call condition metric thresholds 120 used by the UE 102.

In some examples, a UE 102 may be configured to dynamically determine the priority order of codecs listed on the codec priority list 112 based on multiple types of call condition metrics. For instance, a UE 102 may be configured to determine the priority order of codecs based on multiple types of signal strength metrics, based on multiple types of call quality metrics, based on a combination of one or more signal strength metrics and one or more of call quality metrics, or based on any other combination of different types of call condition metrics.

As a non-limiting example, if UE 102A is engaged in a previously-established voice call with UE 102B for which AMR-NB was selected as the selected codec 114, UE 102A may initiate a codec renegotiation process for the voice call that involves UE 102A transmitting a new codec negotiation offer 110 with a new codec priority list 112 to UE 102B. UE 102A may be configured to indicate that the low bitrate codec 106 is the highest-priority codec on the new codec priority list 112 if an RSRP measurement is below a threshold RSRP value of −120 dBm and a packet loss rate measurement associated with the current voice call exceeds a threshold packet loss rate. Accordingly, if UE 102A determines that an RSRP measurement is below −120 dBm and that a packet loss rate measurement associated with the voice call exceeds the threshold packet loss rate, UE 102A may send a new codec negotiation offer 110 to UE 102B that includes a new codec priority list 112 indicating that the low bitrate codec 106 is the highest-priority codec. If UE 102B also supports the low bitrate codec 106, UE 102B may select the low bitrate codec 106 as the new selected codec 114 for the voice call in a new codec negotiation answer 116, and UE 102A and UE 102B can transition from using AMR-NB to using the low bitrate codec 106 for the voice call. However, if UE 102A determines that the RSRP measurement is below the threshold RSRP value of −120 dBm, but that a packet loss rate measurement associated with the voice call does not exceed the threshold packet loss rate such that both conditions for listing the low bitrate codec 106 as the highest-priority are not met, the UE 102 may list AMR-NB and/or other codecs as higher priorities than the low bitrate codec 106 on the new codec priority list 112.

Accordingly, as discussed above, the UE 102 that sends the codec negotiation offer 110 can dynamically determine a priority order for the codecs on the codec priority list 112 based on whether one or more call condition metrics satisfy corresponding call condition metric thresholds 120. The UE 102 that receives the codec negotiation offer 110 can be configured to use codec selection rules 122 to dynamically select the selected codec 114 from the codec priority list 112.

The codec selection rules 122 used by a UE 102 to select the selected codec 114 from a codec priority list 112 can be based at least in part on a supported codec list 108 indicating the codecs that are supported by that UE 102. As an example, the codec selection rules 122 used by UE 102B can indicate that UE 102B may only select a codec, from a codec priority list 112 sent by UE 10A, that is also supported by UE 102B based on the supported codec list 108 maintained by UE 102B.

The codec selection rules 122 can also indicate that a UE 102 should select the low bitrate codec 106 as the selected codec 114 if the codec priority list 112 indicates that the low bitrate codec 106 is the highest-priority codec, or is the highest-priority codec on the codec priority list 112 that the UE 102 itself supports. For example, if UE 102A indicates on the codec priority list 112 that the low bitrate codec 106 is the highest-priority because UE 102A is experiencing relatively poor RF conditions, the codec selection rules 122 may indicate that UE 102B should select the low bitrate codec 106 as the selected codec 114 for the call regardless of the RF conditions that UE 102B is experiencing. Accordingly, even if UE 102B is experiencing relatively good RF conditions, the codec selection rules 122 may direct UE 102B to select the low bitrate codec 106 because UE 102A may have identified the low bitrate codec 106 as the highest-priority codec due to poor RF conditions experienced by UE 102A.

However, if the codec priority list 112 does not indicate that the low bitrate codec 106 is the highest-priority codec, the codec selection rules 122 can cause a receiving UE 102 to dynamically select the selected codec 114 from the codec priority list 112 based at least in part on whether one or more one or more call condition metrics associated with the receiving UE 102 satisfy corresponding call condition metric thresholds 120. For instance, although the low bitrate codec 106 may not be the highest-priority codec on the codec priority list 112, a receiving UE 102 may nevertheless select the low bitrate codec 106 as the selected codec 114 if the receiving UE 102 is experiencing relatively poor call conditions.

As a non-limiting example, UE 102A may send UE 102B a codec priority list 112 that identifies the low bitrate codec 106 as the third-highest priority codec, for instance if UE 102A is experiencing relatively good RF conditions. However, upon UE 102B receiving the codec priority list 112 from UE 102A, the call condition metric determiner 118 of UE 102B may determine that an RSRP value currently associated with a wireless connection between UE 102B and the telecommunication network 104 is at or below a −120 dBm threshold RSRP value. Accordingly, UE 102B may determine that current RF conditions associated with UE 102B are relatively poor, and the codec selection rules 122 may direct UE 102B to select the low bitrate codec 106 as the selected codec 114, even though the codec priority list 112 does not indicate that the low bitrate codec 106 is the highest-priority codec. In this example, although UE 102A may be experiencing relatively good RF conditions, UE 102B can select the low bitrate codec 106 as the selected codec 114 for the call due to the relatively poor RF conditions being experienced by UE 102B.

In some examples, a UE 102 may be configured to initiate a codec renegotiation process during an established call if call condition metrics associated with the UE 102 change to satisfying, or change to not satisfying, corresponding call condition metric thresholds 120. Accordingly, changes of call condition metrics into, and/or out of, ranges associated with good call conditions during an established call can trigger a UE 102 to initiate a codec renegotiation process that includes sending a new dynamically-generated codec priority list 112 to the other UE 102 engaged in the call.

As an example, the low bitrate codec 106 may initially be selected as the selected codec 114 for a call between two UEs 102 because signal strength values indicated that at least one of the two UEs 102 was experiencing poor RF conditions. However, as the call progresses, a UE 102 that had been experiencing poor RF conditions when the call began may move to a different area such that the UE 102 becomes associated with relatively good RF conditions, or RF conditions associate with the UE 102 may otherwise improve. In this situation, that UE 102 may initiate a codec renegotiation process and send a new codec priority list 112 that prioritizes one or more other codecs over the low bitrate codec 106 to the other UE 102. If the other UE 102 is experiencing poor RF conditions, the other UE 102 may choose to select the lower-priority low bitrate codec 106 again, and the UEs 102 can continue to use the low bitrate codec 106 for the call. However, if the other UE 102 is experiencing relatively good RF conditions, the other UE 102 may choose to select another codec from the new codec priority list 112, and the UEs 102 can change from using the low bitrate codec 106 to the other newly-selected codec during the call. The newly-selected codec may, for example, offer better audio quality than the previously-used low bitrate codec 106, such that audio quality for the call can be improved during the call by switching to the newly-selected codec when call conditions change and both UEs 102 are experiencing relatively good call conditions.

As another example, a codec other than the low bitrate codec 106 may initially be selected as the selected codec 114 for a call between two UEs 102 because signal strength values indicated that both of the UEs 102 was experiencing good RF conditions. However, as the call progresses, one of the UEs 102 that had been experiencing good RF conditions when the call began may move to a different area such that the UE 102 becomes associated with relatively poor RF conditions, or RF conditions associated with the UE 102 may otherwise deteriorate. In this situation, that UE 102 may initiate a codec renegotiation process and send a new codec priority list 112 to the other UE 102 that identifies the low bitrate codec 106 as the highest-priority codec. Because the low bitrate codec 106 is listed as the highest-priority codec on the new codec priority list 112, codec selection rules 122 may cause the other UE 102 to select the low bitrate codec 106 as the selected codec 114 regardless of RF conditions being experienced by that other UE 102. Accordingly, the UEs 102 can change from using the previously-selected codec to using the low bitrate codec 106 during the call. The low bitrate codec 106 may encode audio at lower bitrates than the previously-selected codec, such that lower bitrate audio encoded by the low bitrate codec 106 may be more likely to be successfully transmitted in the poor RF conditions than higher bitrate audio encoded by the previously-selected codec.

In some examples, one or both of the UEs 102 may be configured to wait for at least a threshold period of time following an initial selection of a codec for a call and/or a change of the codec used during the call, before initiating a codec renegotiation process and/or corresponding codec change. For example, when a codec renegotiation process is used to change the codec used during a call, the UEs 102 may initiate a codec change timer that is set to a predetermined starting value of 20 seconds, 40 seconds, 60 seconds, or any other value. The UEs 102 may disallow any further codec changes until the codec change timer has expired and a threshold period of time has elapsed following the most recent codec selection or renegotiation. Accordingly, the UEs 102 can prevent codec changes from occuring during a call more frequently than a frequency that corresponds to the starting value of the codec change timer. However, after the codec change timer has expired following the most recent codec selection or renegotiation, either of the UEs 102 may initiate a codec renegotiation process as described herein.

Overall, a UE 102 can dynamically determine a priority order for codecs listed on a codec priority list 112 based on call conditions being experienced by the UE 102. A UE 102 that receives such a codec priority list 112 can also determine which of the listed codecs to select based on call conditions being experienced by that UE 102. Accordingly, the selected codec 114 that is ultimately selected for use during a call between two UEs 102 can be selected based on call conditions experienced by one or both of the UEs 102. Selection of the low bitrate codec 106 may therefore be prioritized if both UEs 102 support the low bitrate codec 106, and if at least one of the UEs 102 is experiencing relatively poor call conditions in which the low bitrate codec 106 may provide a better user experience than higher bitrate codecs.

Example Architecture

Figure 2:
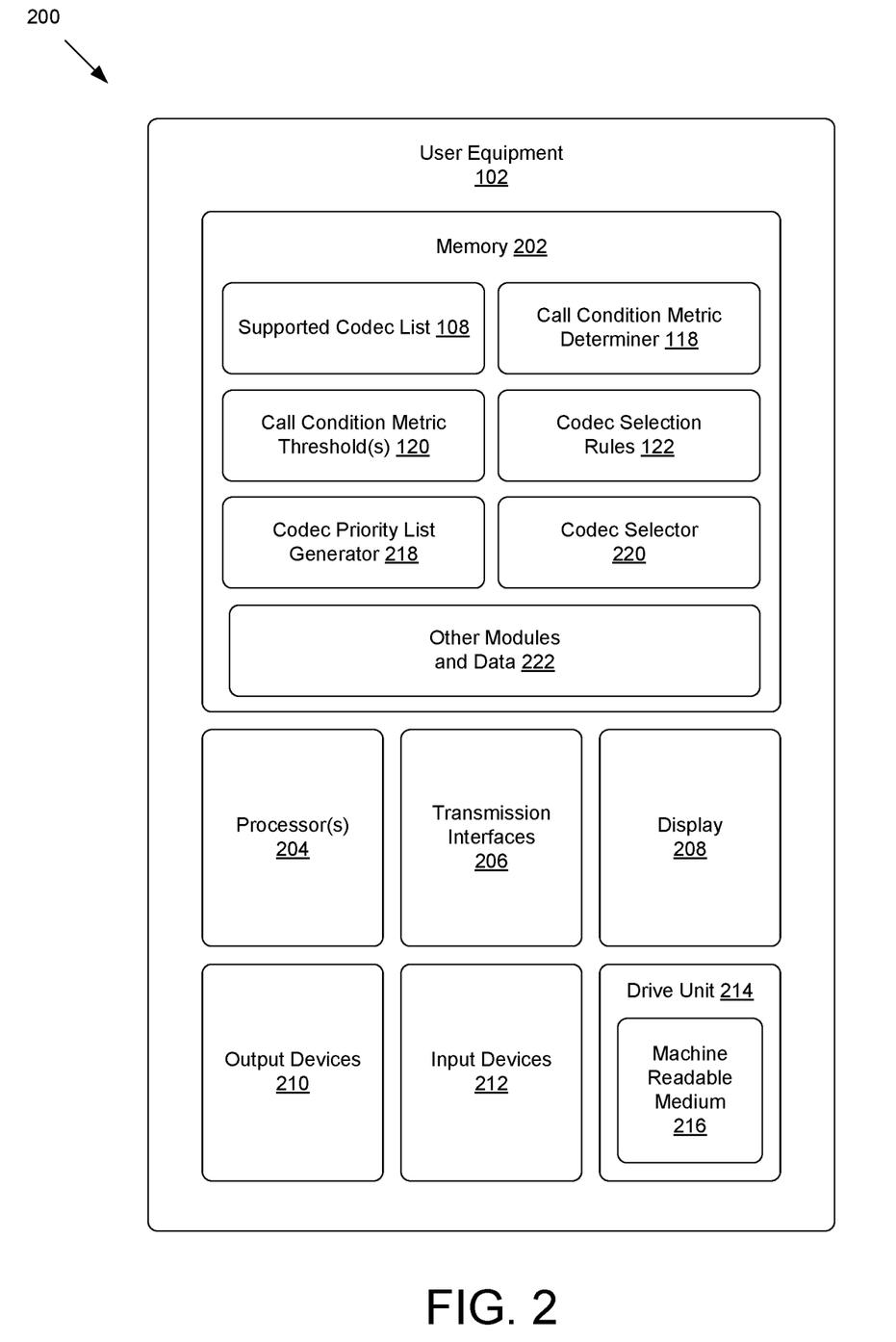
FIG. 2 shows an example of system architecture for a UE.

FIG. 2 shows an example 200 of system architecture for a UE 102, in accordance with various examples. The UE 102 can have at least one memory 202, processor(s) 204, transmission interfaces 206, a display 208, output devices 210, input devices 212, and/or a drive unit 214 including a machine readable medium 216.

In various examples, the memory 202 can include system memory, which may be volatile (such as RAM), non-volatile (such as ROM, flash memory, etc.) or some combination of the two. The memory 202 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 202 can include one or more software or firmware elements, such as data and/or computer-readable instructions that are executable by the one or more processors 204. For example, the memory 202 can store computer-executable instructions and data associated with the supported codec list 108 identifying which codecs the UE 102 supports, the call condition metric determiner 118, the call condition metric thresholds 120, the codec selection rules 122, a codec priority list generator 218, a codec selector 220, and/or other modules and data 222.

The codec priority list generator 218 can be configured to generate a codec priority list 112 when the UE 102 is to send a codec negotiation offer 110 to another UE 102. The codec priority list generator 218 can be configured to generate a codec priority list 112 by determining a priority order of codecs supported by the UE 102 based on one or more types of current call conditions determined by the call condition metric determiner 118 and a comparison of those current call conditions with corresponding call condition metric thresholds 120 as described above. For example, if a comparison of current call condition measurements and corresponding call condition metric thresholds 120 indicate that the UE 102 is experiencing relatively poor call conditions, the codec priority list generator 218 may be configured to list the low bitrate codec 106 as the highest-priority codec on the codec priority list 112, but list the low bitrate codec 106 as a lower priority on the codec priority list 112 if the current call condition measurements and corresponding call condition metric thresholds 120 indicate that the UE 102 is experiencing relatively good call conditions.

The codec selector 220 can be configured to evaluate a codec priority list 112 received from another UE 102, to select one of the codecs on the codec priority list 112 as the selected codec 114 to be used during the call, and to cause a codec negotiation answer 116 to identify the selected codec 114. The codec selector 220 can be configured to select the selected codec 114 based on the codec selection rules 122. For example, the codec selector 220 can be configured to select a selected codec 114 that the UE 102 itself supports. The codec selector 220 can also be configured to select the low bitrate codec 106 if the received codec priority list 112 lists the low bitrate codec 106 as the highest-priority codec and/or if a comparison of current call condition measurements and corresponding call condition metric thresholds 120 indicate that the UE 102 is experiencing relatively poor call conditions.

The other modules and data 222 can be utilized by the UE 102 to perform or enable performing any action taken by the UE 102. The other modules and data 222 can include a platform, operating system, firmware, and/or applications, and data utilized by the platform, operating system, firmware, and/or applications.

In various examples, the processor(s) 204 can be a central processing unit (CPU), a graphics processing unit (GPU), or both CPU and GPU, or any other type of processing unit. Each of the one or more processor(s) 204 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 204 may also be responsible for executing all computer applications stored in the memory 202, which can be associated with types of volatile (RAM) and/or nonvolatile (ROM) memory.

The transmission interfaces 206 can include transceivers, modems, interfaces, antennas, and/or other components that perform or assist in exchanging RF communications with base stations of an access network associated with the telecommunication network 104, a Wi-Fi access point, or otherwise implement connections with the telecommunication network 104 and/or other networks. The transmission interfaces 206 can be compatible with one or more radio access technologies, such as 5G NR radio access technologies and/or LTE radio access technologies. The transmission interfaces 206 can be used by the UE 102 to exchange data with another UE 102, such as a codec negotiation offer 110 and a codec negotiation answer 116. The transmission interfaces 206 can also be used by the UE 102 to send and receive audio data associated with a call, such as audio data that has been encoded using a selected codec 114, and/or any other data.

The display 208 can be a liquid crystal display or any other type of display used in UEs. As an example, the display 208 may be a touch-sensitive display screen, and can thus also act as an input device or keypad, such as for providing a soft-key keyboard, navigation buttons, or any other type of input.

The output devices 210 can include any sort of output devices known in the art, such as the display 208, speakers, a vibrating mechanism, and/or a tactile feedback mechanism. Output devices 210 can also include ports for one or more peripheral devices, such as headphones, peripheral speakers, and/or a peripheral display.

The input devices 212 can include a microphone, a keyboard/keypad, a touch-sensitive display, such as the touch-sensitive display screen described above, one or more sensors, and/or other input devices. A keyboard/keypad can be a push button numeric dialing pad, a multi-key keyboard, or one or more other types of keys or buttons.

The machine readable medium 216 can store one or more sets of instructions, such as software or firmware, that embodies any one or more of the methodologies or functions described herein. The instructions can also reside, completely or at least partially, within the memory 202, processor(s) 204, and/or transmission interface(s) 206 during execution thereof by the UE 102. The memory 202 and the processor(s) 204 also can constitute machine readable media 216.

Example Operations

Figure 3:
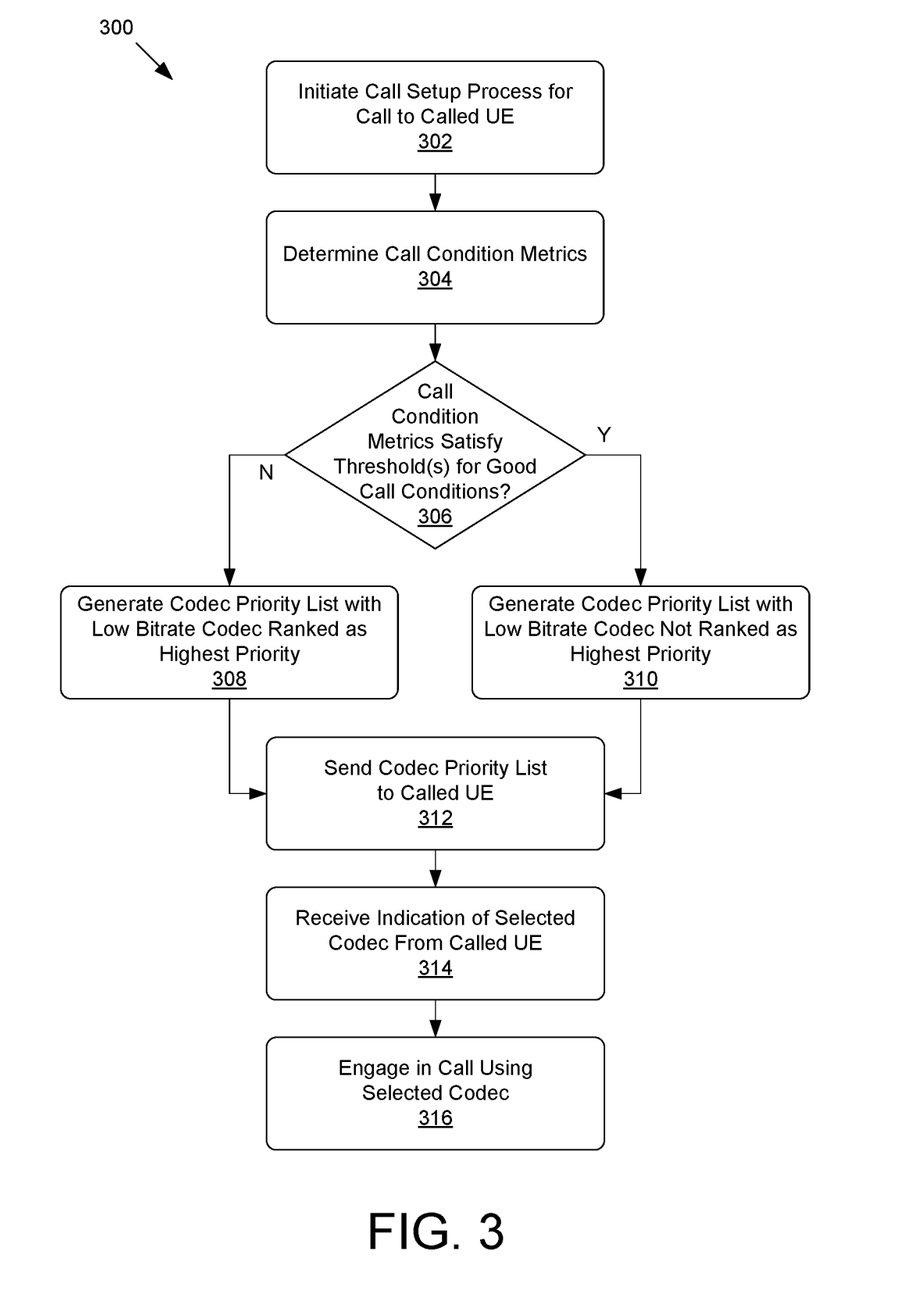
FIG. 3 shows a flowchart of an example method in which a calling UE sets up a call with a called UE.

FIG. 3 shows a flowchart of an example method 300 in which a calling UE 102 sets up a call with a called UE 102. At block 302, the calling UE 102 can initiate a call setup process for the call to the called UE 102. For example, a user of the calling UE 102 may dial a phone number associated with the called UE 102 to initiate the call setup process.

At block 304, the calling UE 102 can determine one or more call condition metrics associated with a connection between the calling UE 102 and the telecommunication network 104. In some examples, the call condition metric determiner 118 of the calling UE 102 can measure one or more call condition metrics, such as signal strength measurements or other indications of RF conditions, associated with the connection with the telecommunication network 104. In other examples, the call condition metric determiner 118 or another element of the calling UE 102 can receive information about such call condition metrics from a base station or other element of the telecommunication network 104.

At block 306, the calling UE 102 can determine whether the call condition metrics determined at block 304 satisfy corresponding call condition metric thresholds 120 associated with good call conditions. As a non-limiting example, the call condition metric thresholds 120 may indicate that an RSRP value above −120 dBm is considered to be associated with good call conditions, while an RSRP value at or below −120 dBm is considered to be associated with poor call conditions.

If the call condition metrics do not satisfy call condition metric thresholds 120 associated with good call conditions (Block 306-No), the calling UE 102 can generate a codec priority list 112 at block 308 that indicates that the low bitrate codec 106 is the highest-priority codec. For example, the codec priority list 112 generated at block 308 may list the low bitrate codec 106 before other codecs supported by the calling UE 102, or may list the low bitrate codec 106 in association with a priority value indicating that the low bitrate codec 106 is a higher priority than the other codecs included in the codec priority list 112.

However, if the call condition metrics do satisfy call condition metric thresholds 120 associated with good call conditions (Block 306—Yes), the calling UE 102 can generate a codec priority list 112 at block 310 that indicates that the low bitrate codec 106 is not the highest-priority codec. For example, the codec priority list 112 generated at block 310 may list one or more other codecs supported by the calling UE 102 before the low bitrate codec 106, or may list the low bitrate codec 106 and other codecs in association with priority values indicating that one or more other codecs included in the codec priority list 112 are higher priorities than the low bitrate codec 106.

At block 312, the calling UE 102 can send the codec priority list 112 generated at block 308 or block 310 to the called UE 102 via the telecommunication network 104. For example, the calling UE 102 can include the codec priority list 112 in a codec negotiation offer 110 sent to the called UE 102, such as an SDP offer included in a SIP INVITE message sent to the called UE 102.

At block 314, the calling UE 102 can receive an indication of a selected codec 114 from the called UE 102. For example, in response to the codec priority list 112 sent at block 312, the called UE 102 can select one of the codecs listed on the codec priority list 112 as the selected codec 114 for the call. The called UE 102 can also include an indication of the selected codec 114 in a codec negotiation answer 116, such as an SDP answer included in a 183 Session Progress response or 200 OK message, that the called UE 102 returns to the called UE 102 in response to the codec negotiation offer 110. Accordingly, at block 314, the calling UE 102 can identify the selected codec 114, selected by the called UE 102, based on a codec negotiation answer 116 returned by the called UE 102. An example process that the calling UE 102 can use to select the selected codec 114 from the codec priority list 112 is discussed further below with respect to FIG. 5.

At block 316, the calling UE 102 can use the selected codec 114 identified at block 314 to engage in the call with the called UE 102. For example, the calling UE 102 can use the selected codec 114 to encode audio input provided by a user to the calling UE 102 into encoded audio data that the calling UE 102 transmits to the called UE 102 via the telecommunication network 104. As another example, the calling UE 102 can use the selected codec 114 to decode encoded audio data received from the called UE 102 via the telecommunication network 104, to generate a recreation of the audio input that was provided by a user to the called UE 102 and that the called UE 102 encoded into the encoded audio data based on the selected codec 114.

In some examples, the calling UE 102 may later determine to initiate a codec renegotiation process during the call set up via the method 300 shown in FIG. 3, for instance to potentially switch from using the selected codec 114 identified at block 314 to using a different codec. An example of a codec renegotiation process is discussed further below with respect to FIG. 4.

Figure 4:
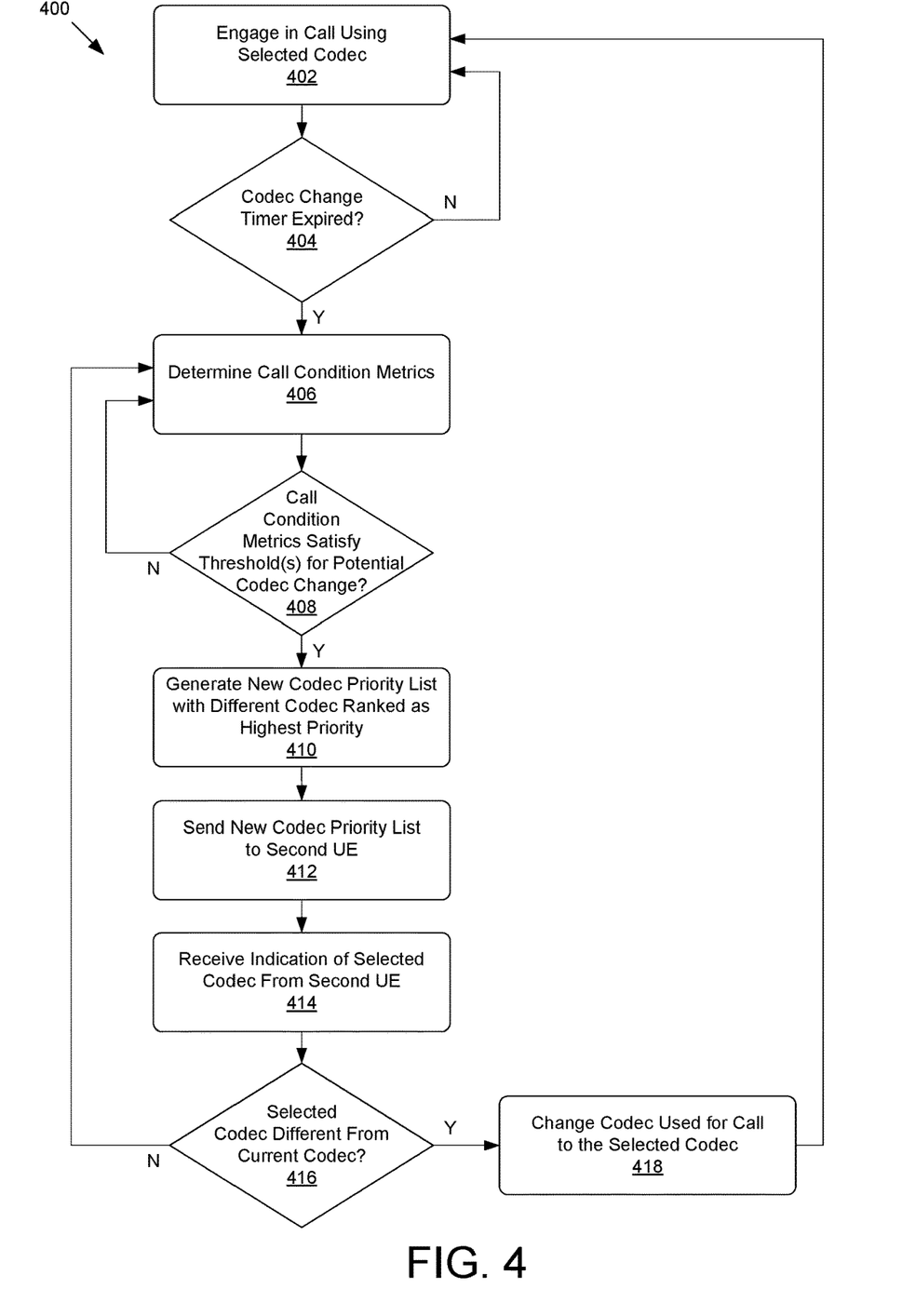
FIG. 4 shows a flowchart of an example method in which a first UE initiates a codec renegotiation process with a second UE during an established call.

FIG. 4 shows a flowchart of an example method 400 in which a first UE 102 initiates a codec renegotiation process with a second UE 102 during an established call. At block 402, the first UE 102 can engage in a call with the second UE 102, and the call can use a selected codec 114. As an example, the first UE 102 may be a calling UE 102 that originally initiated the call in part by generating and sending a codec priority list 112, and the second UE 102 may be a called UE 102 that selected the selected codec 114 from the codec priority list 112, as discussed above with respect to FIG. 3. As another example, the second UE 102 may be a calling UE 102 that originally initiated the call in part by generating and sending a codec priority list 112, and the first UE 102 may be a called UE 102 that selected the selected codec 114 from the codec priority list 112, as discussed above with respect to FIG. 3. As yet another example, one or more previous codec renegotiation processes may already have occurred during the call, and the first UE 102 and the second UE 102 may be using a selected codec 114 that was selected by one of the UEs 102 during the most recent codec renegotiation process.

At block 404, the first UE 102 can determine whether a codec change timer has expired. The first UE 102 can initiate the codec change timer when an initial codec is selected for the call and/or when the codec for the call is initiated, and can be configured to avoid changing the codec during the call before the codec change timer is expired. The codec change timer can be set to a starting value of 20 seconds, 40 second, 60 seconds, or any other starting value. Accordingly, if the codec change timer has not yet expired following the most recent selection or renegotiation of the codec for the call (Block 404—No), the first UE 102 can return to block 402 and continue using the currently-selected codec for the call. However, if the codec change timer has expired following the most recent selection or renegotiation of the codec for the call (Block 404—Yes), the first UE 102 can move to block 406 to begin considering whether to initiate a codec renegotiation process.

At block 406, the first UE 102 can determine one or more call condition metrics with the established call, including signal strength metrics or other metrics associated with a connection between the first UE 102 and the telecommunication network 104, and/or call quality metrics associated with the established call. For example, the call condition metric determiner 118 of the first UE 102 can measure one or more call condition metrics, such as signal strength measurements or other indications of RF conditions, associated with the connection with the telecommunication network 104. The call condition metric determiner 118 of the first UE 102 may also, or alternately, measure or determine one or more call quality metrics associated with the established call, such as packet loss rate values, jitter values, latency values, and/or other metrics associated with transmission and/or receipt of audio data associated with the established call. In some examples, the call condition metric determiner 118 or another element of the first UE 102 can receive information about such call condition metrics from a base station or other element of the telecommunication network 104, and/or from the second UE 102.

At block 408, the first UE 102 can determine whether the call condition metrics determined at block 406 satisfy one or more thresholds associated with potentially changing the codec used for the established call. The thresholds associated with potentially changing the codec used for the established call can be based on call condition metric thresholds 120 that are associated with good call conditions or poor call conditions, and can be satisfied if the call condition metrics have changed from being associated with good call conditions to being associated with poor call conditions or have changed from being associated with poor call conditions to being associated with good call conditions.

As a non-limiting example, the call condition metric thresholds 120 may indicate that an RSRP value above −120 dBm is considered to be associated with good call conditions, while an RSRP value at or below −120 dBm is considered to be associated with poor call conditions. Accordingly, if an RSRP value previously measured by the first UE 102 was below −120 dBm and was associated with poor call conditions, but a new RSRP value measured by the first UE 102 is above −120 dBm and is associated with good call conditions, the first UE 102 can determine that the new RSRP value satisfies a threshold for potentially changing the codec used for the established call. Similarly, if an RSRP value previously measured by the first UE 102 was above −120 dBm and was associated with good call conditions, but a new RSRP value measured by the first UE 102 is below −120 dBm and is associated with poor call conditions, the first UE 102 can determine that the new RSRP value satisfies a threshold for potentially changing the codec used for the established call.

If the call condition metrics determined at block 406 do not satisfy one or more thresholds associated with potentially changing the codec used for the established call (Block 408—No), the first UE 102 can return to block 406 to continue determining one or more call condition metrics with the established call, such that the first UE 102 can determine when such call condition metrics may satisfy thresholds for potentially changing the codec for the established call at block 408. However, if the call condition metrics determined at block 406 do satisfy one or more thresholds associated with potentially changing the codec used for the established call (Block 408—Yes), the first UE 102 can move to block 410 to begin a codec renegotiation process.

At block 410, the first UE 102 can dynamically generate a new codec priority list 112. The new codec priority list 112 generated at block 410 can rank, as the highest-priority codec, a codec that is different from the selected codec 114 that is currently being used for the established call. For example, if the low bitrate codec 106 is currently being used for the established call, for instance because of previous poor RF conditions that are no longer being experienced by the first UE 102, the first UE 102 may rank AMR-NB, AMR-WB, AMR-SWB, EVS, and/or other codecs as higher priorities than the currently-used low bitrate codec 106 on the new codec priority list 112 generated at block 410. As another example, if AMR-WB is currently being used for the established call, for instance because of previous good RF conditions that are no longer being experienced by the first UE 102, the first UE 102 may rank the low bitrate codec 106 as the highest-priority codec on the new codec priority list 112 because current call condition metrics indicate that the first UE 102 is associated with poor call conditions.

At block 412, the first UE 102 can send the new codec priority list 112 generated at block 410 to the second UE 102 via the telecommunication network 104. For example, the first UE 102 can include the codec priority list 112 in a new codec negotiation offer 110 sent to the second UE 102 during the established call, such as an SDP offer included in a SIP RE-INVITE message or SIP UPDATE message sent to the second UE 102.

At block 414, the first UE 102 can receive an indication of a selected codec 114 from the second UE 102. For example, in response to the new codec priority list 112 sent at block 412, the second UE 102 can select one of the codecs listed on the new codec priority list 112 as the selected codec 114 for the call. The second UE 102 can also include an indication of the selected codec 114 in a new codec negotiation answer 116, such as an SDP answer included in a 183 Session Progress response or 200 OK message, that the called UE 102 returns to the called UE 102 in response to the new codec negotiation offer 110. Accordingly, at block 414, the first UE 102 can identify the selected codec 114, selected by the second UE 102, based on a codec negotiation answer 116 returned by the second UE 102. An example process that the second UE 102 can use to select the selected codec 114 from the new codec priority list 112 is discussed further below with respect to FIG. 5.

As discussed above, the established call may already be using a current selected codec 114. The selected codec 114 identified by the second UE 102 at block 414 may be the same as the current selected codec 114, or may be a different new selected codec 114. As a first example, if the currently-selected codec is the low bitrate codec 106, and the first UE 102 initiated the codec renegotiation process to potentially change from the low bitrate codec 106 to a different codec because call conditions associated with the first UE 102 improved, the second UE 102 may nevertheless choose to continue using the low bitrate codec 106 as the selected codec 114 for the call because the second UE 102 is itself currently experiencing poor call conditions. As a second example, if the currently-selected codec is the low bitrate codec 106, and the first UE 102 initiated the codec renegotiation process to potentially change from the low bitrate codec 106 to a different codec because call conditions associated with the first UE 102 improved, the second UE 102 may choose a different codec as a new selected codec 114 for the call if the second UE 102 is experiencing relatively good call conditions. As a third example, if the currently-selected codec is not the low bitrate codec 106, but the first UE 102 initiated the codec renegotiation process to potentially change to using the low bitrate codec 106 because call conditions associated with the first UE 102 deteriorated, the second UE 102 may select the low bitrate codec 106 as the new selected codec 114 for the call.

If the selected codec 114 identified by the second UE 102 at block 414 is the same as the currently-selected codec and is not a different codec (Block 416—No), the UEs 102 can continue to use the currently-selected codec for the call. The first UE 102 can return to block 406 to continue determining one or more call condition metrics with the established call, such that the first UE 102 can determine when such call condition metrics may again satisfy thresholds for potentially changing the codec for the established call at block 408 and another codec renegotiation process can be performed.

However, if the selected codec 114 identified by the second UE 102 at block 414 is different from the currently-selected codec (Block 416—Yes), the first UE 102 can switch from using the currently-selected codec to using the newly-selected and different selected codec 114 for the call at block 418. The second UE 102 can also switch to using the newly-selected and different selected codec 114 for the call, and the call can proceed using the new selected codec 114. After changing the codec used for the call at block 418, the first UE 102 can return to block 402 to continue engaging in the call using the new codec. The first UE 102 may also reset and reinitiate the codec change timer in response to the codec change. Upon expiration of the codec change timer, the first UE 102 may again consider whether to change the codec used for the call, for instance by determining one or more call condition metrics with the established call at block 406, and determining when such call condition metrics may again satisfy thresholds for potentially changing the codec for the established call at block 408 such that another codec renegotiation process can be performed.

Figure 5:
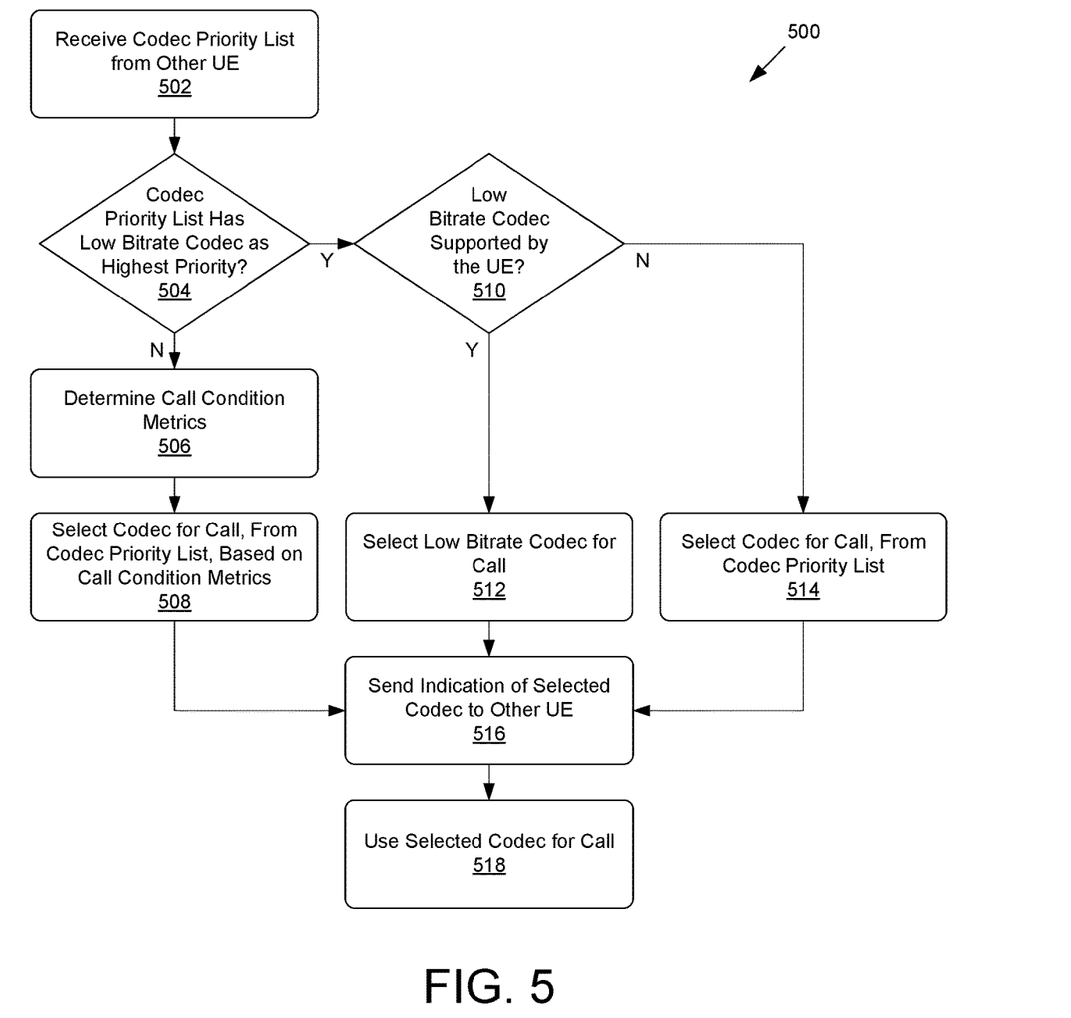
FIG. 5 shows a flowchart of an example method in which a UE can select a selected codec to be used during a call with another UE.

FIG. 5 shows a flowchart of an example method 500 in which a UE 102 can select a selected codec 114 to be used during a call with another UE 102. In some examples, method 500 can be used by a called UE 102 that has received a codec priority list 112 from a calling UE 102 during setup of a new call, for example as discussed above with respect to FIG. 3. In other examples, method 500 can be used during a codec renegotiation process associated with already-established call, for instance by a UE 102 that receives a codec priority list 112 from another UE 102 that initiates a codec renegotiation process as discussed above with respect to FIG. 4. In some examples, a UE 102 can use method 500 to select a codec during a codec renegotiation process if a codec change timer has expired following the most recent selection or renegotiation of a codec for the call.

At block 502, the UE 102 can receive the codec priority list 112 from the other UE 102. For example, if the call has not yet been established, the UE 102 may be a called UE 102 and the other UE 102 may be a calling UE 102, and the called UE 102 can receive the codec priority list 112 in a codec negotiation offer 110 via a SIP INVITE message from the calling UE 102. As another example, if the call is already established, the UE 102 may receive the codec priority list 112 during a codec renegotiation process in a codec negotiation offer 110 via a SIP RE-INVITE message or SIP UPDATE message from the other UE 102.

At block 504, the UE 102 can determine whether the received codec priority list 112 identifies the low bitrate codec 106 as the highest-priority codec. For example, the other UE 102 may have listed the low bitrate codec 106 as the highest-priority codec on the codec priority list 112 if the other UE 102 was experiencing relatively poor call conditions. However, the other UE 102 may have listed one or more other codecs as higher priorities on the codec priority list 112 if the other UE 102 was experiencing relatively good call conditions, or may have omitted the low bitrate codec 106 from the codec priority list 112 if the other UE 102 does not support the low bitrate codec 106.

If the UE 102 determines that the codec priority list 112 received at block 502 does not identify the low bitrate codec 106 as the highest-priority codec (Block 504-No), the UE 102 can determine call condition metrics at block 506. For example, at block 506, the UE 102 can determine signal strength metrics and/or other metrics associated with a connection between the UE 102 and the telecommunication network 104. If the codec priority list 112 was received as part of a codec renegotiation process associated with an existing call with the other UE 102, the UE 102 may also, or alternately, determine call quality metrics associated with the existing call. For example, the call condition metric determiner 118 of the UE 102 can measure one or more call condition metrics, such as signal strength measurements or other indications of RF conditions, associated with a connection between the UE 102 and the telecommunication network 104. If the codec priority list 112 was received as part of a codec renegotiation process associated with an existing call, the call condition metric determiner 118 of the UE 102 may also, or alternatively, measure or determine one or more call quality metrics associated with the existing call, such as packet loss rate values, jitter values, latency values, and/or other metrics associated with transmission and/or receipt of audio data associated with the existing call. In some examples, the call condition metric determiner 118 or another element of the UE 102 can receive information about such call condition metrics from a base station or other element of the telecommunication network 104, and/or from the other UE 102.

At block 508, the UE 102 can select one of the codecs on the codec priority list 112 as the selected codec 114 for the call, based at least in part on the call condition metrics determined at block 506. The UE 102 can select the selected codec 114 by applying codec selection rules 122 to the call condition metrics, and/or by determining whether the call condition metrics satisfy call condition metric thresholds 120 associated with good call conditions or poor call conditions. For example, if the call condition metrics are associated with poor call conditions and the low bitrate codec 106 is listed anywhere on the codec priority list 112, the codec selection rules 122 may direct the UE 102 to select the low bitrate codec 106 as the selected codec 114 for the call. Accordingly, in some situations the UE 102 may select the low bitrate codec 106 as the selected codec 114 for the call even if the low bitrate codec 106 is not identified as the highest-priority codec on the codec priority list 112 received from the other UE 102. However, if the call condition metrics are associated with good call conditions, or the low bitrate codec 106 is not listed on the codec priority list 112, the codec selection rules 122 may direct the UE 102 to select another codec, other than the low bitrate codec 106, as the selected codec 114 for the call.

If the UE 102 instead determines that the codec priority list 112 received at block 502 does identify the low bitrate codec 106 as the highest-priority codec (Block 504—Yes), the UE 102 can determine at block 510 whether the UE 102 itself supports the low bitrate codec 106. The supported codec list 108 maintained by the UE 102 may indicate that the UE 102 does, or does not, support the low bitrate codec 106. Accordingly, at block 510, the UE 102 may use the supported codec list 108 to determine whether the UE 102 supports the low bitrate codec 106.

If the codec priority list 112 identifies the low bitrate codec 106 as the highest-priority codec (Block 504—Yes), and the UE 102 supports the low bitrate codec 106 (Block 510—Yes), the UE 102 can select the low bitrate codec 106 as the selected codec 114 for the call at block 512. In this situation, the UE 102 may select the low bitrate codec 106 for the call regardless of call conditions being experienced by the UE 102, because the other UE 102 may have identified the low bitrate codec 106 as the highest-priority codec on the codec priority list 112 due to relatively poor call conditions being experienced by the other UE 102.

If instead the codec priority list 112 identifies the low bitrate codec 106 as the highest-priority codec (Block 504—Yes), but the UE 102 does not itself support the low bitrate codec 106 (Block 510—No), the UE 102 can select another codec from the codec priority list 112 to use as the selected codec 114 for the call at block 514. For example, the UE 102 can select the highest-priority codec on the codec priority list 112 that the UE 102 does support, or may use codec selection rules 122 to select one of the other codecs on the codec priority list 112 based on call condition metrics determined by the UE 102. As an example, if the codec priority list 112 identifies the low bitrate codec 106 as the highest-priority codec, but the UE 102 does not itself support the low bitrate codec 106, the UE 102 may be configured to select a different codec that may encode audio data at bitrates that are relatively low but that may be higher than could be achieved via the low bitrate codec 106.

At block 516, after selecting the selected codec 114 at block 508, block 512, or block 514, the UE 102 can send an indication of the selected codec 114 to the other UE 102. For example, the UE 102 can include an indication of the selected codec 114 in a codec negotiation answer 116, such as an SDP answer included in a 183 Session Progress response or 200 OK message, that the UE 102 returns to the other UE 102 in response to a codec negotiation offer 110 that included the codec priority list 112.

At block 518, the UE 102 can use the selected codec 114 for the call with the other UE 102. As an example, if the call is a new call, the UE 102 can use the selected codec 114 to encode and decode audio data exchanged with the other UE 102 via the telecommunication network 104. As another example, if the call is an existing call, and the selected codec 114 determined via method 500 is different from a codec that was previously being used to encode and decode audio data for the call, the UE 102 and the other UE 102 can switch from using the previous codec to using the new selected codec 114 determined via method 500.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:
1. A method, comprising:
  determining, by a first user equipment (UE) connected to a telecommunication network, at least one call condition metric associated with the first UE;
  determining, by the first UE, a priority order of a plurality of codecs supported by the first UE based at least in part on the at least one call condition metric, wherein the plurality of codecs includes:

a low bitrate codec that is based at least in part on a machine learning model which has been trained to learn low bitrate compression techniques, wherein the low bitrate codec is a Lyra codec and the machine learning model is a generative model, and at least one additional codec that is configured to encode audio data at higher bitrates than the low bitrate codec;

generating, by the first UE, a codec priority list that indicates the priority order of the plurality of codecs;

sending, by the first UE, the codec priority list to a second UE as part of a codec negotiation with the second UE prior to establishing a call with the second UE;

receiving, by the first UE, an indication of a selected codec from the second UE, wherein the second UE selects the selected codec based on the codec priority list; and when the call is established with the second UE, using, by the first UE, the selected codec to encode and decode audio data associated with the call.

2. The method of claim 1, wherein:
the at least one additional codec is a standardized codec, and
the low bitrate codec is a non-standardized codec.

3. The method of claim 1, wherein the second UE is configured to:
determine that at least one second call condition metric, associated with the second UE, is associated with relatively poor call conditions, based on a second comparison of the at least one second call condition metric with at least one corresponding second threshold associated with the relatively poor call conditions, and
select the low bitrate codec as the selected codec in response to determining that the at least one second call condition metric is associated with the relatively poor call conditions.

4. The method of claim 1, wherein the at least one call condition metric is a signal strength metric associated with a connection between the first UE and the telecommunication network.

5. The method of claim 1, wherein:
the first UE is a calling UE associated with the call,
the second UE is a called UE associated with the call, and
the first UE sends the codec priority list to the second UE during an initial setup of the call.

6. The method of claim 1, wherein:
the selected codec identified by the second UE is different from a previous codec used during a previous call, and
the method further comprises switching, by the first UE, from using the previous codec to encode and decode the audio data associated with the call to using the selected codec identified by the second UE to encode and decode the audio data associated with the call.

7. The method of claim 1, further comprising: determining, by the first UE, that the at least one call condition metric indicates a change from previous call conditions associated with a previous call; and initiating, by the first UE, the codec renegotiation process in response to determining that the at least one call condition metric indicates the change from the previous call conditions.

8. A user equipment (UE), comprising:
one or more processors, and
memory storing computer-executable instructions that, when executed by the one or more processors, cause the UE to perform operations comprising:

determining at least one call condition metric associated with the UE;

determining a priority order of a plurality of codecs supported by the UE based at least in part on the at least one call condition metric, wherein the plurality of codecs includes:

a low bitrate codec that is based at least in part on a machine learning model which has been trained to learn low bitrate compression techniques, wherein the low bitrate codec is a Lyra codec and the machine learning model is a generative model, and at least one additional codec that is configured to encode audio data at higher bitrates than the low bitrate codec;

generating a codec priority list that indicates the priority order of the plurality of codecs;

sending, via a telecommunication network, the codec priority list to a second UE as part of a codec negotiation with the second UE prior to establishing a call with the second UE;

receiving an indication of a selected codec from the second UE, wherein the second UE selects the selected codec based on the codec priority list; and when the call is established with the second UE, using the selected codec to encode and decode audio data associated with the call.

9. A method, comprising:
receiving, by a user equipment (UE) connected to a telecommunication network, a codec priority list from a different UE in as part of a codec negotiation with the different UE prior to establishing a call between the UE and the different UE, wherein:

the codec priority list indicates a priority order, determined by the different UE based on call conditions experienced by the different UE, of a plurality of codecs supported by the different UE, and the plurality of codecs includes:
a low bitrate codec that is based at least in part on a machine learning model which has been trained to learn low bitrate compression techniques, wherein the low bitrate codec is a Lyra codec and the machine learning model is a generative model, and at least one additional codec that is configured to encode audio data at higher bitrates than the low bitrate codec, selecting, by the UE, and based on one or more codec selection rules, a selected codec for the call from the codec priority list;

sending, by the UE, an indication of the selected codec to the different UE; and when the call is established with the different UE, using, by the UE, the selected codec to encode and decode audio data associated with the call.

10. The method of claim 9, wherein:
the UE is a called UE associated with the call,
the different UE is a calling UE associated with the call, and
the UE receives the codec priority list from the different UE during an initial setup of the call.

* * * * *